Jan. 11, 1966  E. V. BERGSTROM ETAL  3,228,185
THERMAL EXHAUST GAS AFTERBURNERS FOR AUTOMOBILES
Filed Oct. 5, 1961  3 Sheets-Sheet 2

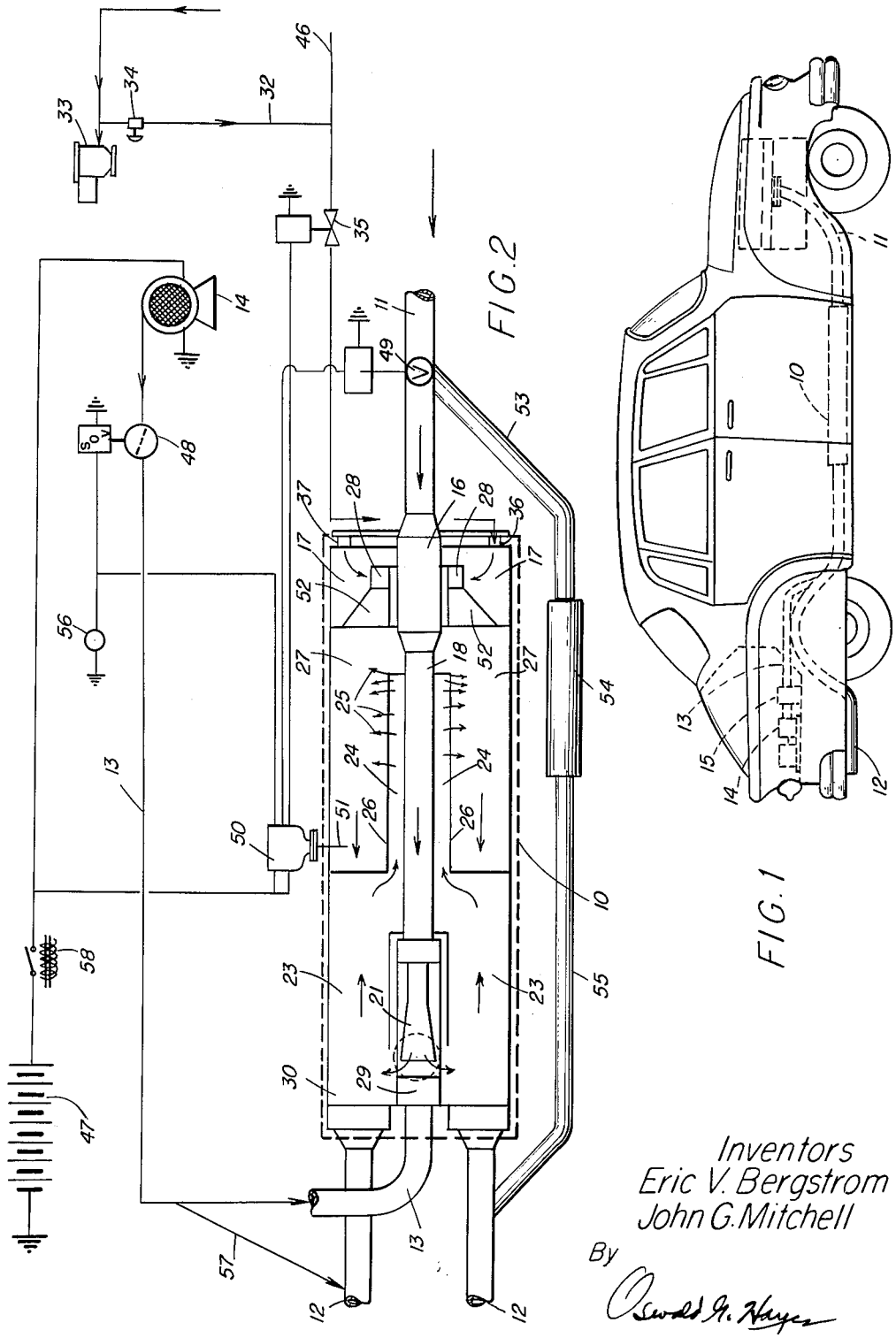

Inventors
Eric V. Bergstrom
John G. Mitchell
By Oswald G. Hayes
Attorney

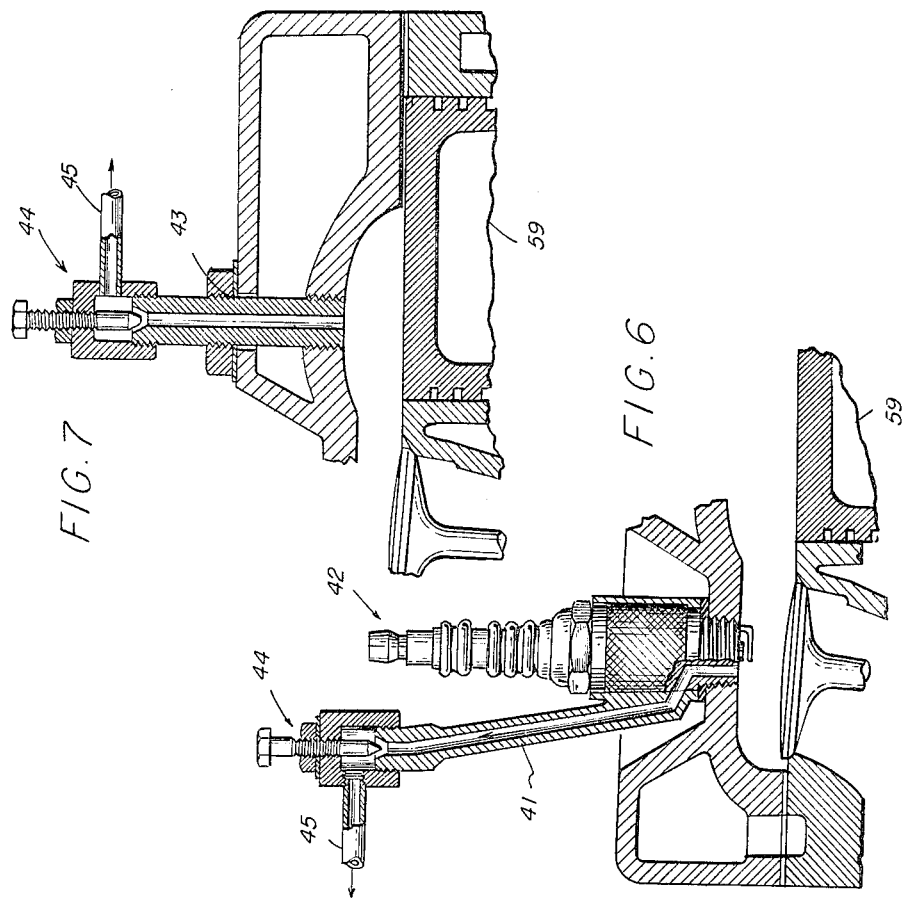
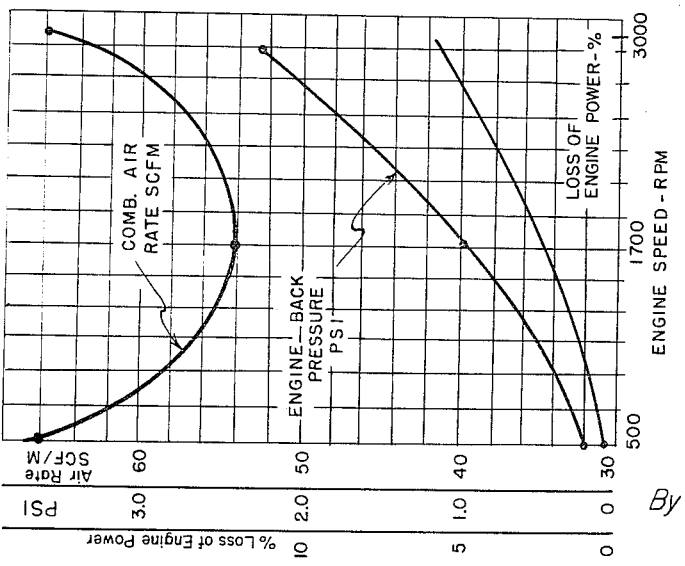
Inventors
Eric V. Bergstrom
John G. Mitchell
By
Oswald G. Hayes
Attorney

United States Patent Office 3,228,185
Patented Jan. 11, 1966

3,228,185
THERMAL EXHAUST GAS AFTERBURNERS FOR AUTOMOBILES
Eric V. Bergstrom, Byram, Conn., and John G. Mitchell, Larchmont, N.Y., assignors to Socony Mobil Oil Company, Inc., a corporation of New York
Filed Oct. 5, 1961, Ser. No. 143,207
17 Claims. (Cl. 60—30)

This invention relates to means for the reduction of noxious and irritating gases in automobile exhausts.

The problem of air pollution, especially in the highly populated, industrial urban areas is too well known to need further description. Automobile exhaust gases have been considered to be a substantial contributing factor to this pollution. There has been much activity trying to find a practical means for purifying automobile exhaust gases. Afterburner means, both the catalytic and the thermal types, have been extensively tested. Until now, none of these have been found to be sufficiently practical to be commercially installed by any atuomobile manufacturer.

The present invention has as its primary objective to improve the design of afterburners to the point where they are commercially practical.

Present afterburners do not have adequate air supply means to insure complete combustion and good temperature control. They use comparatively inefficient combustion chambers, in the thermal varieties, and they are inefficient in their use of supplementary fuel in their pilot burners, so that the overall fuel economy of the automobile is unnecessarily lowered.

Broadly described, the invention is a thermal afterburner, adapted to be connected to the exhaust of an internal combustion engine, principally comprising the combination of a highly efficient, slot-type heat exchanger, having a high heat exchange area/volume, an efficient combustion chamber and pilot burner, the combustion chamber being so designed to make the greatest possible use of the sensible heat content of the hot gases from the pilot burner, economical means for supplying fuel and air to said pilot burner, and a venturi induction jet, in the exhaust line, and low-pressure blower combination for supplying supplemental air and for mixing said air with the exhaust gases from said internal combustion engine. The low pressure blower is defined as including any and all means for impelling air through a conduit, including a fan, centrifugal blower, or even a pump. These elements combine to form an afterburner capable of efficiently combusting the hydrocarbons and other noxious and irritating substances in the engine's exhaust with a minimum of supplementary fuel and without causing an excessive decrease in the efficiency or the maximum power output of the engine.

It has been found that the herein described low-pressure blower and the venturi induction jet, acting in combination, give a stable supply of supplemental air suitably in excess, preferably about 90 to 270% in excess, of combustion requirements. Previous devices have used either a blower or a jet singly, and were not able to provide air in a constant, adequately large quantity under all engine conditions. It should be understood that this combination can be applied equally well to a catalytic afterburner. The large supply of air serves the additional purpose of preventing sudden temperature rises which would harm the afterburner structure.

FIGURE 1 is a diagrammatic elevation view of a front-engine automobile showing the relative placement of the afterburner, and its supplementary parts, in operating position;

FIGURE 2 is an instrumentation diagram showing the afterburner and its subsidiary elements including the control circuits and certain alternative arrangements for the fuel and combustion air piping systems;

FIGURE 6 is a vertical partial sectional view of the cylinder of the engine from which the gasoline-air mixture for the pilot burner may be drawn showing a special spark plug used for that purpose;

FIGURE 7 is a sectional view of the cylinder generally similar to that illustrated in FIGURE 6 showing an alternative device for drawing off the fuel-air mixture; and FIGURE 8 is a graph showing the relationship between the rate of combustion air flow to the combustion chamber of the afterburner, engine back pressure and percent loss of engine power due to back pressure for various engine speeds.

Figure 3:
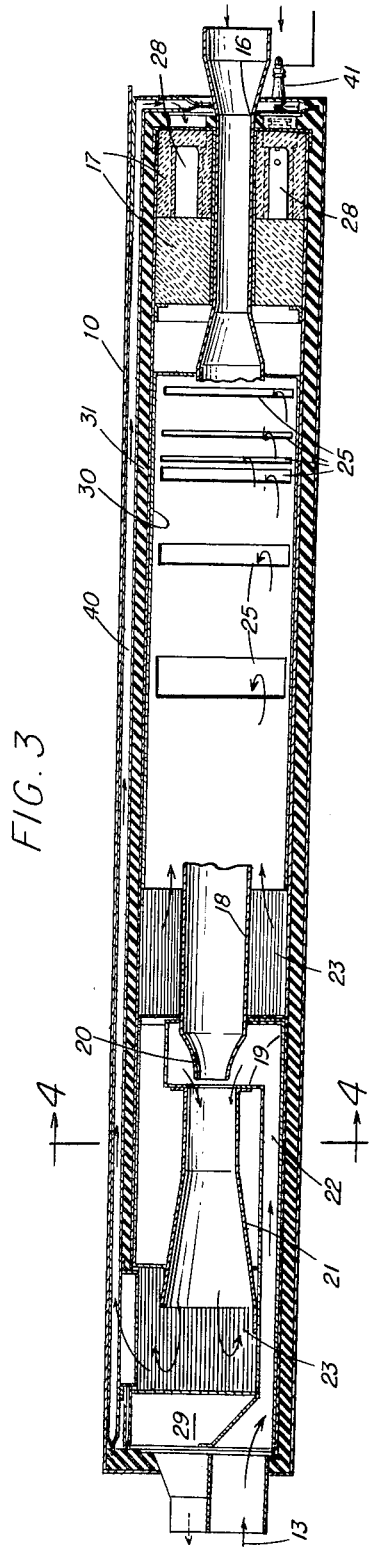
FIGURE 3 is a sectional view showing the major components of the afterburner.

FIGURE 1 shows the outer sheet metal covering 10 of the afterburner attached to the engine's exhaust line 11 in place of the usual muffler. The combusted exhaust leaves the afterburner through twin exhaust pipes 12. The combustion air is supplied to the afterburner through air inlet 13 leading from the low pressure air fan 14. As an example, the fan may be a six or a twelve volt electrically driven fan, with a rated capacity of 32 to 85 standard cubic feet per minute at 0.2 to 0.5 inch $H_2O$ pressure. Control devices 15 are conveniently located in the car's trunk or any other suitable location.

Figure 4:
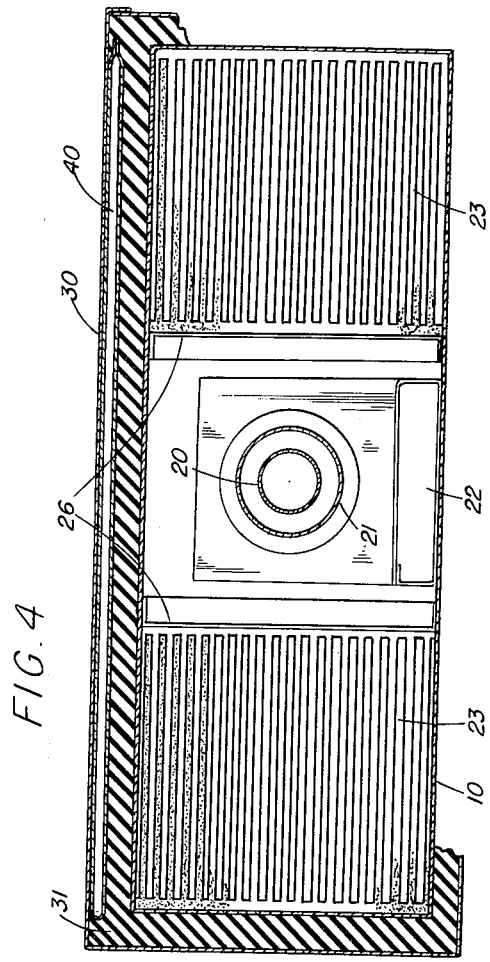
FIGURE 4 is a vertical sectional view taken along 4—4 of FIGURE 3.
Figure 5:
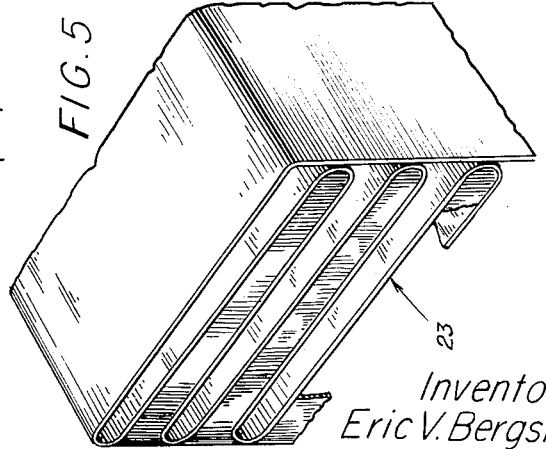
FIGURE 5 is an enlarged detail perspective view of a portion of the heat exchanger shown in FIGURE 4.

The afterburner device and its controls are shown in greater detail in FIGURES 2, 3 and 4.

The exhaust pipe 11 leading from the manifold attaches to the exhaust gas inlet line 16 of the afterburner at a point outside of the case 10. The exhaust gas inlet line 16, an elliptical pipe with its major axis in a horizontal plane, passes through the refractory material 17 of the pilot burner 28. This inlet line continues along the length of the afterburner as a circular pipe 18 after it leaves the pilot burner zone. The end of this pipe passes into the combustion air duct 19. The pipe is gradually decreased in diameter at one end to form a nozzle 20 within the air duct 19. The air inlet line 13 is joined to the afterburner on the end opposite to the exhaust gas inlet. A rectangular air duct 22, located along the bottom of the afterburner, is expanded upwardly at 19 to enclose one end of the exhaust gas inlet line 18. Coaxial with the nozzle 20, a venturi unit 21 is attached to a wall of the air duct on the same center line axis as nozzle 20. The walls of the venturi are parallel where they join the air duct; they begin to angle outwardly a short distance beyond to minimize exhaust gas pressure loss. The blower and the jet work together to bring in the combustion air in such a manner that at low engine speeds the blower supplies most of the energy for bringing in the air. At high engine speeds, when the back pressure on the engine and the jet induction efficiency are at their maximum, the jet supplies the main part of the energy for drawing in the combustion air.

On either side of the air duct and venturi nozzle device is located a slot-type heat exchanger 23. In the embodiment shown, the exchangers, preferably made of thin-gauge refractory, corrosion resistant material such as stainless steel, run from a point just forward of the rear end of the afterburner to a point almost midway along the afterburner. The heat exchangers are of the single-pass, countercurrent flow, multi-channel, slot-type.

These heat exchangers are designed to be as compact as possible while still having a large heat transfer area. The large heat transfer area is needed to transfer the larger amount of heat due to the large amount of excess air used in the afterburner for excessive temperature suppression. As shown, they may be formed from single sheets of metal, such as stainless steel, which are bent in the accordion structure shown. Alternate layers are sealed at both ends, but are open along parts of the sides adjacent to the exhaust inlet line 18, and the manifold 29, as outlet and inlet respectively. The top and bottom layers end in flaps, bent at 90°, which are spot welded to the bended joints on the sides in the accordion structure. One of the flaps, on each exchanger, has strips cut out near the ends running the full height of the flap, which form the inlet and outlet referred to above. These exchangers are prefabricated and slit-fitted into the afterburner. This is useful for cutting down the final manufacturing cost because of its being easily adaptable to mass production methods of fabrication and to facilitate repair replacement. One end of the inlet side of the heat exchangers opens into the space between the flared end of the venturi and the rear end of the unit, the other end opens into an enclosed corridor 24 located in the center of the afterburner which extends longitudinally almost the full remaining length and upwardly the full height of the unit. The exhaust gas inlet line 18 runs through the center of the corridor 24. Slot mixing orifices 25 are located along the side walls 26 of the corridor. The width of the slots vary in the manner shown generally in FIGURE 3 so that the quantity of fuel-air mixture passing through each slot decreases as the gases move downstream. The first zone has three inlet slots, but the total flow of exhaust gas-air mixture is less than in the zone two slot. The first zone slots are arranged so that the widest slot is nearest to the pilot burner. The slots 25 open into the exhaust and pilot mixing and combustion zone 27, which is completely divided into two halves by the walls of the corridor 24 except for the small space between the front end of the corridor and the refractory material 17.

In the first zone, nearest to the pilot burner, a proper amount of the exhaust gas-and-air mixture is mixed directly with the hot pilot burner gases. The resulting temperature of this first-zone mixture is above the ignition temperature of the exhaust gas and air mixture so that complete combustion is insured.

The hot gases from the first zone then flow to the second zone where they mix with more exhaust gas-air mixture, similarly heating said exhaust gas-air mixture to a temperature above the ignition point, to insure complete combustion. This cycle is repeated in each of the succeeding zones; the amount of exhaust gas-air mixture expelled into each zone increases in each suceeding zone. By using the hot gases from each preceding zone to heat up the succeeding zones, in this manner, the required amount of pilot burner gases needed to heat the afterburner is reduced, which results in a corresponding saving in the necessary supplementary fuel.

The pilot burner 28, of the tangential firing type, is formed to provide a continuous cyclic path for the pilot burner flame. Two pilot gas inlet ports 52 lead from the pilot burner to the mixing zone 27; the ports are so constructed that they discharge the pilot gas into the streams of the exhaust-air mixture being expelled through the slot mixing orifices 25, at a velocity sufficient to cause mixing with the gas from the nearest slot in the first zone of combustion. The pilot inlet ports are shaped like truncated rectangular pyramids with the bases pointed toward the combustion zone.

The downstream end of the combustion zone is open to the outlet side of the heat exchangers 23. The downstream ends of the heat exchangers exhaust to the dual exhaust lines 12.

The afterburner case 30, made of a refractory and corrosion resistant material such as stainless steel, is encased with insulation 31, which is in turn wrapped with the light sheet metal case 10.

Supplementary fuel is desirably supplied to the pilot burner during the warm-up period. Structure to accomplish this may be provided in several different ways, such structure would, of course, be just as effective for a catalytic afterburner, as for this thermal type.

One apparatus is illustrated in FIGURE 2. A supplemental fuel line 32 is attached to the line between the fuel pump and the carburetor 33, containing a fuel flow set screw 34 and a pilot fuel cut-off valve 35 which is set to close when the temperature in the combustion zone 27 reaches about 1400–1600° F. The supplemental fuel line leads into the burner through air inlet ports 36 and 37. These air inlet ports are connected to a duct 40, located at the top of the unit between the insulation 31 and the sheet metal wrapping 10, which extends the full length and width of the unit. The upstream end of this duct opens into a larger duct located just above the flared end of the venturi 21.

A spark plug 41 is installed at the outer edge of the pilot burner so as to be able to ignite the fuel-air mixture in the burner.

A novel device illustrated as alternative structure in FIGURES 6 and 7, eliminates the need for the separate fuel line, with all of its attendant fire and operating hazards and added expense. By taking a portion of the fuel-air mixture from one cylinder of the engine, the total fuel consumption is decreased. It is well known to those skilled in the art that in the operation of a modern multi-cylinder internal combustion engine there is almost always at least one cylinder which is fed substantially more fuel than it needs for efficient operation. This cylinder is easily found and should be the one from which the fuel is taken for the pilot burner.

One cylinder 59 of the internal combustion engine may be provided with means shown in FIGURES 6 and 7 for supply of part, for example 12–50 percent, of the fuel-air mixture from that cylinder directly to the pilot burner.

The mixture is forced to the pilot burner during the compression stroke by the energy supplied by the piston. Some combustion gas mixture also flows to the pilot burner during the power stroke. The mixture exits from the cylinder through a specially designed spark plug 42 and conduit 41, as in FIGURE 6, or through a special tap 43 screwed into a hole drilled into the cylinder head. These taps lead to a needle control valve 44. Line 45 connects the needle control valve with line 46, as in FIGURE 2. For this system, the pilot feed cut-off valve 35 is set to close in the range 1200–1500° F.

Combustion air is supplied through line 13 from the air fan 14 driven by any suitable means, such as an internal electric motor, FIGURE 2. The combustion air cut-off valve 48 closes at the desired temperature, for example in the range 1600–1900° F., shutting off the air to prevent overheating which may be caused by an excessive amount of unburnt fuel in the exhaust resulting from faulty engine operation such as poor ignition, leaky valves, etc.

The air cut-off valve 48 and the fuel cut-off valve 35 are operated by the double contact type afterburner temperature control switch 50. These elements are operated responsive to the thermocouple measuring device 51 located in the combustion zone. The switch 50 also operates a dashboard warning light 56 which is set to flash when the air is shut off.

Electric energy required by the system is supplied by the car battery 47 and is turned on or off by the ignition switch relay 58.

An additional feature which may be added to the system, if desired, is a by-pass muffler 54 (shown in FIG. 2) which would serve to further decrease warm-up time. By-pass control valve 49 partially closes line 11 in response to control switch 50, forcing most of the engine exhaust gas into line 53, through the by-pass muffler 54, and through line 55 which is connected to one of the tail exhaust pipes 12.

To protect pedestrians from the hot exhaust from the afterburner, an additional modification may be made. Additional cooling dilution air may be added to the exhaust lines 12 through line 57. Line 57 taps air from the air line 13 leading from the blower to the afterburner.

As is shown in FIGURE 8, the loss of engine power because of the afterburner does not exceed 6% at maximum power, while the back pressure against the engine is not over about 2.3 pounds per square inch.

As a result of the several possible modifications of this invention, it is adaptable enough to be attached to any type of car, new or old. Its novel arrangement for providing combustion air in a large and constant quantity makes it equally suited for purging the exhaust of a relatively clean and efficient new engine or of a dirty and inefficient older engine. Certain of the many different types of cars on the market may require a slightly different modification or arrangement of elements as will be apparent to the man skilled in the art. Obviously, therefore, the scope of the invention is not to be interpreted strictly in conformity to the examples herein set forth, but should be held inclusive of such arrangements and constructions as fall within the scope and spirit of the appended claims.

What is claimed is:

1. A thermal exhaust gas afterburner, comprising a combustion chamber, a pilot burner, means for supplying a substantially stable supply of supplementary air in intimate admixture with the exhaust gas from the internal combustion engine to the combustion chamber, means for mixing the supplementary air and exhaust gas with the hot gases from the pilot burner in the combustion chamber and heat exchange means for providing indirect heat exchange between hot gases leaving the combustion chamber and air and exhaust gas passing into the burner, said heat exchange means comprising two slot-type, multichannel, single-pass, countercurrent heat exchangers in parallel, each of said heat exchangers being formed of a single sheet of corrosion resistant, refractory material shaped into an accordion-like structure of rectangular cross-section, alternate layers of said structure being closed at the ends, but open on the sides near the ends, these openings acting as inlets and outlets for fluids passing through the exchanger, the remaining area along the sides of the exchanger being closed, the sides being joined at the bends to flaps of material, part of the same sheet, bent at approximately 90 degree angles to the top and bottom surface of the heat exchanger, the flap on one side having strips cut out at each end, running the full height of the flap, to form the inlet and outlet for the alternate layers opening on that side, said compact heat exchangers being well adapted to being slip fitted into the afterburner case.

2. For use in a thermal exhaust gas afterburner, means for effecting the combustion of the exhaust gas comprising a combustion chamber, a pilot burner, inlet ports connecting the pilot burner to the combustion chamber, inlet pipe having one closed end, to said combustion chamber, said inlet pipe being located along the longitudinal axis of said combustion chamber and having orifice slots located along its length, the first of said slots closest to said pilot burner inlet ports, which is at the closed end of said inlet pipe, being positioned adjacent to the normal path of gas flowing from said inlet ports into said combustion chamber so that gas flowing from the interior of said inlet pipe into said combustion chamber will be mixed with gas flowing through said inlet ports into said combustion chamber, the remaining slots being successively and discretely situated along and adjacent to the normal path of gas flowing through said combustion chamber so as to effect the mixture of the gas flowing through each slot with the gas in the volume of the combustion chamber adjacent said slot, said orifice slots being so spaced apart along said inlet pipe and of such individual areas available for gas flow therethrough that the volumetric flow of gas passing through each slot, for a given velocity through said inlet pipe, is smaller through those slots nearest said inlet ports, while the linear velocity of the gas passing through said orifice slots remains substantially constant.

3. An afterburner for use in the exhaust system of an internal combustion engine, said afterburner comprising a combustion chamber, conduit means for connecting said combustion chamber in serial relationship to the exhaust system of an internal combustion engine, a pilot burner having fuel and air intake means, a conduit to conduct hot, combusted gases from said pilot burner into the combustion chamber, means for introducing to said afterburner combustion chamber a large, stable flow of air, substantially in excess of that required for complete combustion of all the combustibles in the engine exhaust in intimate mixture with the exhaust gas from the internal combustion engine, said means including a substantially constant speed low pressure air blower provided with an outlet, a venturi induction jet connected in series with the exhaust line of the internal combustion engine and upstream from the combustion chamber, and piping means between the outlet of said blower and said induction jet, said combustion chamber having inlet means for admitting thereto, in discrete zones along the length of said combustion chamber, discrete mixtures of air and engine exhaust gas, said inlet means comprising a conduit located approximately along the longitudinal axis of said combustion chamber, having orifices spaced along the walls of said conduit, said orifices being so designed that the volumetric flows of exhaust gas-air mixture expelled into the discrete zones, for burning, decrease along the length of the combustion chamber in the direction of the pilot burner inlet ports, but the velocity of the exhaust gas-air mixture is sufficient in all cases to insure adequate mixing with the hot, burnt gases in the chamber.

4. The combination of claim 3 wherein the fuel and air intake means for the pilot burner comprises piping means connecting the interior of one cylinder of the engine and said pilot burner whereby a portion of the fuel-air mixture from said cylinder is forced into the pilot burner during the compression stroke.

5. The combination of claim 4, wherein the piping means between the interior of said cylinder and the pilot burner is comprised of a tap drilled through the cylinder head of the cylinder, a pipe connecting that tap and the pilot burner, a valve for adjusting the rate of flow of the fuel-air mixture, an automatic, temperature-actuated valve set to shut off the flow of fuel and air to the burner when the temperature in the afterburner unit reaches a specified value.

6. The combination of claim 4, wherein the piping means between the interior of said cylinder and the pilot burner comprises a specially constructed sparkplug having a conduit means running through to the interior of said cylinder, piping means connecting the conduit means in the sparkplug to the pilot burner, a valve for adjusting the rate of flow of the fuel-air mixture, and an automatic, temperature actuated valve set to shut off the flow of fuel and air to the burner when the temperature in the afterburner unit reaches a specified value.

7. In combination with an internal combustion engine having an exhaust system: a thermal exhaust gas afterburner having inlet means for exhaust gas and supplementary air, coupling means connecting said exhaust gas inlet means in series connection with the exhaust system of the engine, means for supplying a substantially stable amount of supplementary air in excess of that required for complete combustion of the exhaust gas, a combustion chamber for burning the exhaust gas with the supplementary air, means for providing indirect heat exchange between the incoming exhaust gas and supplementary air and hot burnt gases from said combustion means, a pilot burner for providing hot gases for admixture with exhaust gas and air in said combustion chamber for the purpose of raising the temperature sufficiently for combustion of the exhaust gas in said chamber, piping means to provide a normally open communication between the interior of one cylinder of the engine and said pilot burner to carry a portion of the fuel-air admixture from said cylinder to the pilot burner during at least the compression stroke, means responsive to the temperature in said combustion chamber for regulating the flow of the fuel-air mixture from said cylinder to the pilot burner, ignition means for igniting the fuel-air mixture from the cylinder in the pilot burner, and means for conducting the combustion pilot burner gases to the exhaust gas and air mixture.

8. In combination with an exhaust gas afterburner for an internal combustion engine having a pilot burner, means for supplying said pilot burner with fuel and air comprising conduit means between the interior of one cylinder of the internal combustion engine and the pilot burner for flow of fuel-air mixture from said cylinder into said pilot burner during at least the compression stroke of said cylinder, and flow control means responsive to the temperature in said afterburner for regulating the flow through said conduit.

9. An afterburner for use in the exhaust system of an internal combustion engine, said afterburner comprising a combustion chamber, conduit means for connecting said combustion chamber in serial relationship to the exhaust system of an internal combustion engine, said combustion chamber being characterized by having of plurality of spaced apart inlet means disposed in between the exhaust end portion of said burner and a supplementary heat zone in said burner in open communication with said exhaust portion for passage into said chamber via said inlet means of a mixture of (1) air substantially in excess of that required for combustion of combustibles in the engine exhaust and (2) exhaust gas from the internal combustion engine, said inlet means being disposed such that the quantity of gas flow through said burner is higher at its exhaust portion than in the supplementary heat zone, and supply means for supplying said mixture to said inlet means.

10. An afterburner, as defined in claim 9, in which said supply means comprise a substantially constant speed low pressure air blower provided with an outlet, an induction jet disposed in said conduit means upstream from said combustion chamber, and piping means connecting the outlet of said blower and said induction jet.

11. In combination with an internal combustion engine having an exhaust system, an afterburner as defined in claim 9.

12. The combination of claim 9 which contains means for providing flow of a hot combusted gas through said combustion chamber, comprising a pilot burner having fuel and air intake means and a conduit to conduct ignited vapors therefrom to said combustion chamber, and said plurality of inlet means comprise means for passage of said passage of said mixture into said chamber at volumetric flow rates decreasing the direction o f said supplementary heat zone.

13. In combination with an internal combustion engine having an exhaust system, an afterburner as defined in claim 12.

14. An afterburner for combustion of a mixture of exhaust gases from an internal combustion engine and air, comprising a combustion chamber adapted for flow of gases therethrough, said combustion chamber being characterized by having a plurality of spaced apart inlet means disposed in between the exhaust end portion of said burner and a supplementary heat zone in said burner in open communication with said exhaust end portion for passage of the unignited mixture into said chamber, said inlet means being disposed such that the quantity of gas flow through said burner is greater in said exhaust end portion than in said supplementary heat zone.

15. A thermal exhaust gas afterburner, as defined in claim 14, further comprising heat exchange means for providing indirect heat exchange between the combustion products leaving said chamber and said mixture passing into said chamber.

16. The combination of claim 15 in which the heat exchange means comprises a counter-current heat exchanger, a conduit including one side of said heat exchanger to conduct gases to said combustion chamber and a second conduit including another side of said heat exchanger to conduct gases from said combustion chamber to the exterior of said afterburner.

17. In the method of afterburning a mixture of exhaust gases from an internal combustion engine and air, comprising passing said mixture into a combustion zone which contains a supplementary heat zone and an exhaust end portion, burning said mixture to form combusted products as it flows through said combustion zone and exhausting said combusted products from said exhaust end portion, the improvement which comprises passing said mixture, while below its ignition temperature, into said combustion zone at a plurality of points spaced apart in between said supplementary heat zone and said exhaust end portion such that the quantity of gas flow through said combustion zone is greater in said exhaust end portion than in said supplementary heat zone, and igniting in said supplementary heat zone the portion of said mixture which is passed through.

References Cited by the Examiner

UNITED STATES PATENTS

| | | | |
|---|---|---|---|
| 1,355,310 | 10/1920 | Cartmill | 313—120 X |
| 1,875,024 | 8/1932 | Kryzanowsky | 60—30 X |
| 2,611,586 | 9/1952 | Collins | 257—245 |
| 2,649,685 | 8/1953 | Cohen | 60—30 |
| 2,833,479 | 5/1958 | Novesky | 60—29 X |
| 2,953,898 | 9/1960 | Cornelius | 60—30 |
| 2,956,865 | 10/1960 | Williams | 60—30 X |
| 2,985,434 | 5/1961 | Boring et al. | 257—245 |
| 3,036,897 | 5/1962 | Uphoff | 60—30 X |
| 3,086,353 | 4/1963 | Ridgway | 60—30 |

FOREIGN PATENTS 404,283  11/1909  France.

SAMUEL LEVINE, *Primary Examiner.*

JULIUS E. WEST, *Examiner.*